US012597601B2

(12) United States Patent
Uchida et al.

(10) Patent No.: US 12,597,601 B2
(45) Date of Patent: Apr. 7, 2026

(54) ELECTROCHEMICAL ELEMENT, METHOD FOR PRODUCING SAME, AND ELECTROCHEMICAL DEVICE

(71) Applicant: Panasonic Intellectual Property Management Co., Ltd., Osaka (JP)

(72) Inventors: Shuhei Uchida, Osaka Fu (JP); Yoshinori Satou, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 828 days.

(21) Appl. No.: 17/796,173

(22) PCT Filed: Dec. 17, 2020

(86) PCT No.: PCT/JP2020/047195
§ 371 (c)(1),
(2) Date: Jul. 28, 2022

(87) PCT Pub. No.: WO2021/153076
PCT Pub. Date: Aug. 5, 2021

(65) Prior Publication Data
US 2023/0083365 A1 Mar. 16, 2023

(30) Foreign Application Priority Data

Jan. 31, 2020 (JP) ................................ 2020-015857

(51) Int. Cl.
*H01M 4/485* (2010.01)
*H01M 4/04* (2006.01)
(Continued)

(52) U.S. Cl.
CPC ......... *H01M 4/485* (2013.01); *H01M 4/0404* (2013.01); *H01M 4/0428* (2013.01); (Continued)

(58) Field of Classification Search
None
See application file for complete search history.

(56) References Cited

U.S. PATENT DOCUMENTS 9,543,564 B2 1/2017 Fasching et al.
10,707,482 B2 7/2020 Hirose et al.
(Continued)

FOREIGN PATENT DOCUMENTS

CN 108140823 A 6/2018
CN 108269979 A * 7/2018 .............. H01M 4/48
(Continued)

OTHER PUBLICATIONS

International Search Report dated Mar. 2, 2021, issued in counterpart International application No. PCT/JP2020/047195, with English translation. (5 pages).
(Continued)

*Primary Examiner* — Zhongqing Wei
(74) *Attorney, Agent, or Firm* — WHDA, LLP

(57) ABSTRACT

An electrochemical element includes a current collector, and an active material layer on the current collector, wherein the active material layer includes active material particles each having a lithium silicate composite particle including a lithium silicate phase and silicon particles dispersed therein, and a first coating that covers at least a portion of a surface of the lithium silicate composite particle, the first coating includes an oxide of a first element other than a non-metal element, and the active material layer has a thickness TA, and T1b<T1t, where T1b is a thickness of the first coating covering the lithium silicate composite particle at a position of 0.25 TA from the current collector surface in the active material layer, and T1t is a thickness of the first coating
(Continued)

covering the lithium silicate composite particle at a position of 0.75 TA from the current collector surface in the active material layer.

15 Claims, 4 Drawing Sheets

(51) Int. Cl.

| | |
|---|---|
| *H01M 4/36* | (2006.01) |
| *H01M 4/38* | (2006.01) |
| *H01M 4/62* | (2006.01) |
| *H01M 10/0525* | (2010.01) |
| *H01M 50/46* | (2021.01) |

(52) U.S. Cl.
CPC ........... *H01M 4/366* (2013.01); *H01M 4/386* (2013.01); *H01M 4/625* (2013.01); *H01M 10/0525* (2013.01); *H01M 50/46* (2021.01)

(56) References Cited

U.S. PATENT DOCUMENTS

| | | | |
|---|---|---|---|
| 2008/0020271 A1 | 1/2008 | Sato et al. | |
| 2016/0308202 A1 | 10/2016 | Kuriyama et al. | |
| 2016/0372753 A1 | 12/2016 | Fukasawa et al. | |
| 2017/0309950 A1 | 10/2017 | Minami et al. | |
| 2018/0040886 A1 | 2/2018 | Yokoi et al. | |
| 2018/0261833 A1 | 9/2018 | Hirose et al. | |
| 2018/0287140 A1 | 10/2018 | Akira et al. | |
| 2018/0287148 A1 | 10/2018 | Akira et al. | |
| 2020/0020927 A1 | 1/2020 | Sadakane et al. | |
| 2020/0020932 A1* | 1/2020 | Asano ................... | H01M 4/386 |
| 2020/0350563 A1 | 11/2020 | Uchiyama et al. | |
| 2021/0111395 A1 | 4/2021 | Shin et al. | |
| 2021/0288316 A1 | 9/2021 | Sha et al. | |

FOREIGN PATENT DOCUMENTS

| | | |
|---|---|---|
| JP | 2007-059213 A | 3/2007 |
| JP | 2009-104900 A | 5/2009 |
| JP | 2013-251097 A | 12/2013 |
| JP | 2015-130254 A | 7/2015 |
| JP | 2017-097999 A | 6/2017 |
| JP | 2019-012646 A | 1/2019 |
| KR | 20150098453 A | 8/2015 |
| WO | 2015/145521 A1 | 10/2015 |
| WO | 2016/136180 A1 | 9/2016 |
| WO | 2019130787 A1 | 7/2019 |

OTHER PUBLICATIONS

Written Opinion dated Mar. 2, 2021, issued in counterpart International application No. PCT/JP2020/047195. (4 pages).

Extended (Supplementary) European Search Report dated Jul. 20, 2023, issued in counterpart EP Application No. 20916316.1. (6 pages).

Luo, W. et al., Surface and Interface Engineering of Silicon-Based Anode Materials for Lithium-Ion Batteries, Advanced Energy Materials, vol. 7, No. 24, Jul. 21, 2017, pp. 1-28, XP055590829.

Yamada, M. et al., Reaction Mechanism of "SiO"-Carbon Composite-Negative Electrode for High-Capacity Lithium-Ion Batteries, Journal of the Electrochemical Society, vol. 159, No. 10, Aug. 29, 2012, pp. A1630-A1635, XP055451680.

Office Action dated Nov. 15, 2023, issued in counterpart CN application No. 202080094777.2, with English translation. (12 pages).

* cited by examiner

1

ELECTROCHEMICAL ELEMENT, METHOD FOR PRODUCING SAME, AND ELECTROCHEMICAL DEVICE

TECHNICAL FIELD

The present disclosure relates mainly to an improvement in an active material layer.

BACKGROUND ART

Along with the diversification of electrochemical device applications, various performance improvements are required. In this regard, Patent Literature 1 proposes covering a surface of the positive electrode and negative electrode with a metal oxide.

CITATION LIST

Patent Literature

PLT1: Japanese Laid-Open Patent Publication No. 2017-97999

SUMMARY OF INVENTION

Active materials repeat expansion and contraction along with charge/discharge. Therefore, durability of an electrochemical device is easily reduced. Particularly, silicon compounds significantly expand and contract.

An aspect of the present disclosure relates to an electrochemical element including a current collector, and an active material layer supported on the current collector, wherein the active material layer includes active material particles, the active material particles each include a lithium silicate composite particle including a lithium silicate phase and silicon particles dispersed in the lithium silicate phase, and a first coating that covers at least a portion of a surface of the lithium silicate composite particle, the first coating includes an oxide of a first element other than a non-metal element, and the active material layer has a thickness TA, and $T1b<T1t$ is satisfied, where $T1b$ is a thickness of the first coating that covers the lithium silicate composite particle at a position of 0.25 TA from the surface of the current collector in the active material layer, and $T1t$ is a thickness of the first coating that covers the lithium silicate composite particle at a position of 0.75 TA from the surface of the current collector in the active material layer.

Another aspect of the present disclosure relates to an electrochemical device including a first electrode, a second electrode, and a separator interposed therebetween, wherein one of the first electrode and the second electrode is composed of the electrochemical device described above.

Still another aspect of the present disclosure relates to a method for producing an electrochemical element including: a preparation step of preparing lithium silicate composite particles each including a lithium silicate phase and silicon particles dispersed in the lithium silicate phase, a supporting step of supporting the lithium silicate composite particles on a surface of a current collector to form a precursor layer, a rolling step of rolling the precursor layer, and a coating formation step, after the rolling step, of forming a first coating including an oxide of a first element other than a non-metal element on at least a portion of a surface of the lithium silicate composite particles by allowing the lithium silicate composite particles to expose in a gas phase including the first element.

The present disclosure enables suppression of expansion of the active material layer. Thus, the present disclosure can provide a long life electrochemical device.

DESCRIPTION OF EMBODIMENTS

A. Electrochemical Element

Figure 1:
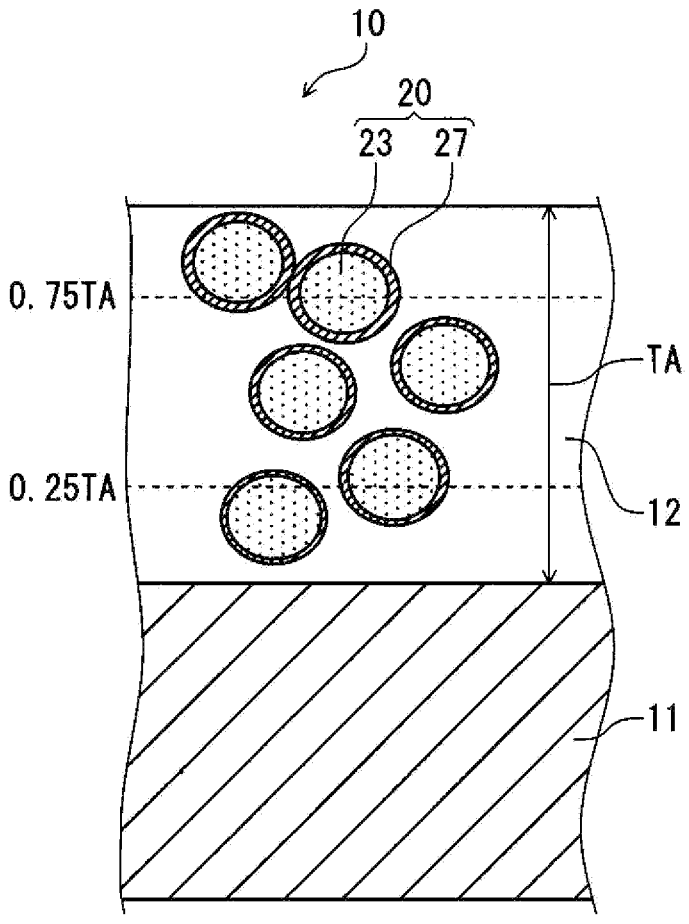
FIG. 1 is a schematic cross sectional view of a main portion of the electrochemical element of an embodiment of the present disclosure.

The electrochemical element according to the embodiment of the present disclosure includes a current collector and an active material layer supported on the current collector. The active material layer includes active material particles. The active material particles each include a lithium silicate composite particle including a lithium silicate phase and silicon particles dispersed in the lithium silicate phase, and a first coating that covers at least a portion of a surface of the lithium silicate composite particle. The first coating includes an oxide of the first element other than a non-metal element.

The first coating is thicker with the active material particles that are distant from the current collector surface. The active material particles that are distant from the current collector easily expand, and therefore largely affect the expansion of the active material layer. By making the first coating of the lithium silicate composite particles that are disposed distantly from the current collector thicker, effects of suppression of their expansions improve. Thus, durability of the electrochemical device improves. Meanwhile, the first coating of the lithium silicate composite particles that are disposed near the current collector is thin, and therefore reduction in electrical conductivity of the active material particles is suppressed.

Specifically, when the active material layer has a thickness TA, the relation $T1b<T1t$ is satisfied: the thickness $T1b$ being the thickness of the first coating that covers the lithium silicate composite particles at a position of 0.25 TA from the surface of the current collector in the active material layer, and the thickness $T1t$ being the thickness of the first coating that covers the lithium silicate composite particles at a position of 0.75 TA from the surface of the current collector in the active material layer. The surface of the current collector means an interface between the active material layer and the current collector. The position of 0.25 TA from the surface of the current collector in the active material layer means a position of 0.25 TA from the interface between the active material layer and the current collector. The position of 0.75 TA from the surface of the current collector in the active material layer means a position of 0.75 TA from the interface between the active material layer and the current collector.

The thickness T1b and the thickness T1t may satisfy $0.02 \leq T1b/T1t < 1$, may satisfy $0.1 \leq T1b/T1t \leq 0.7$, or may satisfy $0.2 \leq T1b/T1t \leq 0.5$.

The thickness T1b and the thickness T1t of the first coating can be measured by observing the cross sections of the active material particles using SEM or TEM.

First, an electrochemical device is disassembled and an electrochemical element (e.g., electrode) is taken out, and the cross section of the element is obtained using a cross section polisher (CP). In the cross-sectional images obtained using SEM or TEM, setting the active material layer thickness as TA, 10 lithium silicate composite particles are selected, which are partly overlapping the straight line drawn at a position of 0.25 TA drawn from the current collector in the active material layer and have a largest diameter of 5 μm or more. For each of the particles selected, the thickness of the first coating is measured at one or two points where the above-described straight line crosses the outer edge of the lithium silicate composite particles. An average value of the thicknesses of a maximum of 20 points of these is obtained. After this average value is calculated, an average value is calculated again, excluding data with the value different from the average value by 20% or more. This modified average value is regarded as the thickness T1b of the first coating at a position of 0.25 TA. Similarly, using a straight line drawn at a position of 0.75 TA from the surface of the current collector in the active material layer, the thickness T1t of the first coating at a position of 0.75 TA is calculated.

The origin of the first coating is at an interface between the mother particle (described later) formed by the lithium silicate composite particles and the first coating. For example, a point at which the intensity of the peak attributed to Li obtained by SEM-EDS spectrometry is 1/10 or less of the peak attributed to the first element can be regarded as the origin of the first coating. The end point of the first coating can be regarded as, for example, the point at which the intensity of the peak attributed to the first element obtained by SEM-EDS spectrometry is 5% or less of its maximum value. If a second coating is formed, the end point of the first coating is the interface between the first coating and the second coating.

The first coating thickness changes so as to increase from the surface of the current collector surface toward the outer side. This change can be continuous, or stepwise, and it only needs to be grasped as an overall trend.

For example, lithium silicate composite particles are selected at a plurality of points (e.g., five points) having differing distances from the surface of the current collector and are present on a straight line drawn in the thickness direction; for each of the particles selected, the thickness of the first coating is measured at one or two points where the above-described straight line crosses the outer edge of the lithium silicate composite particles. A plurality of straight lines (e.g., five) in the thickness direction of the active material layer are drawn to measure the thickness of the first coating in the same manner. The coating thickness calculated in this manner is plotted in a graph where the lateral axis is the distance from the surface of the current collector, and the vertical axis is the coating thickness. From this graph, when the approximation straight line or the approximation curved line obtained by the least squares method increases to the right, it can be judged that the first coating thickness increases from the surface of the current collector toward the outer side as an overall trend.

The first coating allows for suppression of the lithium silicate composite particles expansion. Therefore, degradation of the electrochemical element is suppressed, and an electrochemical device with a high capacity and a long life can be provided.

Examples of the electrochemical element include an electrode. The electrode is at least one of a positive electrode and a negative electrode used for, for example, a secondary battery. Preferably, the electrode according to the embodiment of the present disclosure is used as a negative electrode for a lithium ion secondary battery.

[Current Collector]

As the current collector, a non-porous conductive substrate (metal foil, etc.), and a porous conductive substrate (mesh-body, net-body, punched sheet, etc.) are used.

[Active Material Layer]

The active material layer includes active material particles. The active material particles each include a lithium silicate composite particle including a lithium silicate phase and silicon particles dispersed in the lithium silicate phase, and a first coating that covers at least a portion of a surface of the lithium silicate composite particle. The active material layer is formed on the surface of the current collector. The active material layer may be formed on one surface of the current collector or on both surfaces thereof.

(Lithium Silicate Composite Particles)

The lithium silicate composite particles each include a lithium silicate phase, and silicon particles dispersed in the lithium silicate phase. The lithium silicate composite particles have a lithium silicate phase of a sea-portion, and silicon particles as an island-portion in a sea-island structure.

The lithium silicate composite particles are usually present as secondary particles in which a plurality of primary particles are coagulated. First coating covers at least a portion of a surface of the secondary particle. The primary particles each include a silicate phase and silicon particles dispersed in the silicate phase.

The particle size of the lithium silicate composite particles is not particularly limited. The average particle size of the lithium silicate composite particles may be, for example, 1 μm or more and 20 μm or less. The average particle size of the lithium silicate composite particles means the particle size (volume average particle size) at which volume integrated value is 50% in volume particle size distribution measured by a laser diffraction scattering method.

<Lithium Silicate Phase>

The lithium silicate phase (hereinafter, sometimes may be referred to simply as silicate phase) does not have many sites capable of reacting with lithium, and thus does not easily cause a new irreversible reaction during charge/discharge. Thus, it exhibits excellent charge/discharge efficiencies at the initial stage of charge/discharge.

The silicate phase is an oxide phase containing Li, Si, and O. The atomic ratio (=O/Si) of O to Si in the silicate phase is, for example, more than 2 and less than 3. With the O/Si in this range, it is advantageous in terms of stability and lithium ion conductivity.

The silicate phase is represented by $Li_{2z}SiO_{2+z}$ (z is $0<z<1$). In view of stability, ease of manufacture, lithium ion conductivity, etc., $z=\frac{1}{2}$ is more preferable.

The silicate phase may further contain an element M. M can be at least one selected from the group consisting of, for example, Be, Mg, Al, B, Zr, Nb, Ta, La, V, Y, Ti, P, Bi, Zn, Sn, Pb, Sb, Co, Er, F, and W. Above all, B has a low melting point, which is advantageous for improving flowability of molten silicate. In addition, Al, Zr, Nb, Ta, and La can improve Vickers hardness while maintaining ion conductivity of the silicate phase. The element M is contained, for example, at 10 mol % or less, or 5 mol % or less, relative to a total amount of the element other than 0 contained in the silicate phase.

<Silicon Particles>

The silicon particles dispersed in the silicate phase have a particulate phase of elemental silicon (Si), and are composed of a single or a plurality of crystallites. The crystallite size of the silicon particles is not particularly limited. The crystallite size of the silicon particles is preferably 10 nm or more and 30 nm or less, more preferably 15 nm or more and 25 nm or less. When the crystallite size of silicon particles is 10 nm or more, the surface area of the silicon particles can be kept small, so that deterioration of the silicon particles involving generation of an irreversible capacity hardly occurs. The crystallite size of the silicon particles is calculated by the Sheller's equation from the half width of the diffraction peak assigned to the Si (111) plane of the X-ray diffraction (XRD) pattern of the silicon particles.

In order to increase the capacity and improve cycle characteristics, the content of the silicon particles in the lithium silicate composite particles may be, for example, 30 mass % or more and 80 mass % or less. By setting the content of the silicon particles to 30 mass % or more, the ratio of the silicate phase is reduced, and the initial charge/discharge efficiency is easily improved. By setting the content of the silicon particles to 80 mass % or less, the degree of expansion and contraction of the lithium silicate composite particles during charging and discharging can be easily reduced.

<Carbon Phase>

The lithium silicate composite particles may each include a carbon phase along with the silicate phase and the silicon particles. The carbon phase covers at least a portion of a surface of, for example, the silicon particles, and is present in at least a portion of an interface of the adjacent primary particles.

The content of the elements contained in the lithium silicate composite particles can be calculated by SEM-EDS spectrometry using a powder sample of the lithium silicate composite particles under, for example, a discharged state. The powder sample is analyzed to determine a spectrum intensity of the respective elements. Then, a standard sample of a commercially available element is used to create a calibration curve, and the content of the respective elements contained in the silicate phase is calculated.

The respective elements in the lithium silicate composite particles can be quantified also by ICP-AES analysis (inductively coupled plasma emission spectroscopy), Auger electron spectroscopy (AES), laser ablation ICP mass spectroscopy (LA-ICP-MS), X-ray photoelectron spectroscopy (XPS), and the like.

(First Coating)

The first coating covers at least a portion of a surface of the lithium silicate composite particles, each of which is a secondary particle. The first coating includes a first element other than a non-metal element.

The thickness T1b is not particularly limited: T1b being a thickness of the first coating that covers the lithium silicate composite particles at a position of 0.25 TA from the surface of the current collector in the active material layer. In view of suppressing erosion, the thickness T1b may be 0.1 nm or more, 0.5 nm or more, or 1 nm or more. In view of electrical conductivity and lithium ion diffusivity, the thickness T1b of the first coating may be 50 nm or less, 10 nm or less, or 2 nm or less. The thickness T1b of the first coating may be 0.1 nm or more and 50 nm or less, or 0.1 nm or more and 10 nm or less.

The thickness T1t is not particularly limited: T1t being a thickness of the first coating that covers the lithium silicate composite particles at a position of 0.75 TA from the surface of the current collector in the active material layer. In view of electrical conductivity and lithium ion diffusivity, the thickness T1t may be 50 nm or less, 30 nm or less, 10 nm or less, or 2 nm or less. In view of suppressing erosion, the thickness T1t may be 0.1 nm or more, 0.5 nm or more, or 1 nm or more. The thickness T1t of the first coating may be 0.1 nm or more and 50 nm or less, or 0.1 nm or more and 30 nm or less. However, T1t is larger than T1b.

The average thickness $T1_A$ of the first coating is also not particularly limited. In view of erosion suppression, the average thickness $T1_A$ of the first coating may be 0.1 nm or more, 0.5 nm or more, or 1 nm or more. In view of electrical conductivity and lithium ion diffusivity, the average thickness $T1_A$ of the first coating may be 50 nm or less, 10 nm or less, or 2 nm or less. The average thickness $T1_A$ of the first coating is, for example, 0.1 nm or more and 50 nm or less.

The average thickness $T1_A$ of the first coating can be calculated by averaging the thickness T1b and the thickness T1t.

The first element is an element other than non-metal elements, and includes metal elements and so-called half metal elements. Preferably, the first element may contain at least one element selected from the group consisting of Group 3 elements, Group 4 elements, Group 5 elements, and Group 6 elements of the periodic table in that the lithium silicate composite particles are highly effective in suppressing corrosions. Preferably, in particular, the first element may include at least one selected from the group consisting of Al, Ti, Si, Zr, Mg, Nb, Ta, Sn, Ni, and Cr.

When two or more kinds of oxide are included, the oxides may be present in a mixed state, or may be arranged separately in a layer form.

The closer to the surface of the lithium silicate composite particle, the more the first element is present. As a result, the effects of suppressing expansion of the lithium silicate composite particles are improved.

Specifically, setting a thickness of the first coating that covers the lithium silicate composite particles at any points as T1, preferably, Cb>Ct is satisfied: Cb being a concentration of the first element at a position of 0.25 T1 in the first coating from the surface of the lithium silicate composite particles, and Ct being a concentration of the first element at a position of 0.75 T1 in the first coating from the surface of the lithium silicate composite particles. The surface of the lithium silicate composite particles means an interface between the first coating and the lithium silicate composite particles.

The concentration Cb and the concentration Ct may satisfy Cb/Ct>2.

The average concentration $C_A$ of the first element in the first coating is not particularly limited. The concentration $C_A$ may be, for example, 1% or more, or 3% or more. In other words, when the concentration $C_A$ is 1% or more, the coating is the first coating including the first element. The concentration $C_A$ may be, for example, 80% or less, or 50% or less. The average concentration $C_A$ can be calculated by averaging the concentration Cb and the concentration Ct.

The concentration Cb of the first element inside the first coating can be determined by evaluating element distribution state (depth profile) using Energy Dispersive X-ray Spectroscopy (EDS). The thickness T1 of the first coating is divided into four to evaluate the profile at a position of 0.25T1 from the surface of the lithium silicate composite particles. A plurality of other random lithium silicate composite particles (e.g., 5) are also evaluated as well, and the results are averaged, to obtain the concentration Cb of the first element at that point.

The concentration Cb can also be obtained by X-ray Photoelectron Spectroscopy (XPS), Electron energy-loss spectroscopy (EELS), or ESCA (also referred to as Electron Spectroscopy for Chemical Analysis)) along with ion etching, to evaluate the distribution of the first element in the thickness direction. The concentration Cb can be calculated from the mole fraction of the oxide of the first element in the first coating. The mole fraction can be calculated from the measurement results of EDS or EELS, and the calibration curve.

Similarly, the profile at a position of 0.75 T1 from the surface of the lithium silicate composite particles can be evaluated to obtain the concentration Ct.

The first coating may include an oxide of a first element other than a non-metal element, and include a carbon atom. This improves electrical conductivity of the active material particles. The oxide and the carbon atom are preferably present together in the described first coating.

The average element ratio $R_A$ (=first element/carbon atom) is not particularly limited: $R_A$ being an average element ratio of the first element relative to the carbon atom in the first coating that covers any lithium silicate composite particles. The element ratio $R_A$ may be, for example, 0.01 or more and 99 or less, 0.1 or more and 10 or less, or 0.1 or more and 3 or less.

Regardless of presence or absence of the carbon in the first coating, it is desirable that the first element is present more as it becomes closer to the surface of the lithium silicate composite particles.

Specifically, when the first coating that covers the lithium silicate composite particles has a thickness T1, it is desirable that the Rb>Rt is satisfied: Rb (=first element/carbon atom) being the element ratio of the first element to the carbon atom at a position 0.25 T1 from the surface of lithium silicate composite particles in the first coating, and the element ratio Rt (=first element/carbon atom) being the first element to the carbon atom at a position 0.75 T1 from the surface of the lithium silicate composite particles in the same first coating.

The element ratio Rb and the element ratio Rt may satisfy Rb/Rt>1.3, may satisfy Rb/Rt>2, or may satisfy Rb/Rt>3.

The element ratio Rb is not particularly limited: Rb being the element ratio of the first element to the carbon atom at a position of 0.25 T1 from the surface of the lithium silicate composite particles in the first coating. The element ratio Rb may be, for example, 5 or more and 99 or less, 10 or more and 99 or less, or 20 or more and 99 or less.

The element ratio Rt is not particularly limited: Rt being the element ratio of the first element to the carbon atom at a position of 0.75 T1 from the surface of the lithium silicate composite particles in the first coating. The element ratio Rt may be, for example, 0.01 or more and 10 or less, or 0.01 or more and 5 or less.

The element ratio of inside the first coating can be obtained by evaluating element distributions of the first element and the carbon atom using EDS or the like in the same manner as described above. The average element ratio $R_A$ can be calculated by averaging the element ratio Rb and element ratio Rt.

Examples of the carbon include amorphous carbon having a low crystallinity such as carbon black, coal, cokes, charcoal, and activated carbon, and graphite having a high crystallinity. Preferably, amorphous carbon is used due to the low hardness and significant buffering action against the silicon particle which changes its volume with charge/discharge. The amorphous carbon can be soft carbon, or hard carbon. Examples of the carbon black include acetylene black and Ketjen Black. Graphite means a material having a graphite type crystal structure, and includes, for example, natural graphite, artificial graphite, graphitized mesophase carbon particles, and the like.

(Second Coating)

At least a portion of the first coating may be covered with a second coating having an electrical conductivity. This further improves electrical conductivity of the active material particles.

The second coating, unlike the first coating, does not contain an oxide of the first element. That the second coating does not contain an oxide of the first element is synonymous with that the intensity of the peak attributed to the first element obtained by SEM-EDS is the detection-limit or less.

The second coating contains a conductive material. Preferably, the conductive material may be a conductive carbon material in that it is electrochemically stable. Examples of the electrically conductive carbon material include the above-described carbon which may be included in the first coating.

The thickness of the second coating is not particularly limited. Preferably, the second coating is thin enough that it does not substantially affect the average particle size of the lithium silicate composite particles. The average thickness of the second coating may be 1 nm or more, or 5 nm or more. The average thickness of the second coating may be 200 nm or less, or 100 nm or less.

The average thickness of the second coating can be calculated in the same manner as the average thickness of the first coating.

Preferably, the average thickness of the first coating $T1_A$ and the average thickness of the second coating $T2_A$ satisfy the relation of $0<T2_A/T1_A<1500$. Preferably, $T2_A/T1_A$ is 2 or more, 5 or more, or 10 or more. Preferably, $T2_A/T1_A$ is 500 or less, or 100 or less.

The origin of the second coating is the interface with the first coating. The end point of the second coating is the outermost point in the active material particles that can be identified by SEM or TEM images. The end point of the second coating can also be a point at which the intensity of the peak attributed to C obtained by SEM-EDS spectrometry is 5% or less of its maximum value.

Preferably, the thickness T1 of the first coating that covers any of the lithium silicate composite particles and the thickness T2 of the second coating satisfy the relation of $0<T2/T1<1500$. This makes it easier to achieve both corrosion-resistance and conductivity improvement. Preferably, T2/T1 is 5 or more, or 10 or more. Preferably, T2/T1 is 500 or less, or 100 or less.

The thickness of the first coating that covers any lithium silicate composite particles and the second coating can be measured by cross-sectional observations of lithium silicate composite particles using SEM or TEM in the same manner as when determining the average thickness of the first coating. From the cross sectional images of the electrochemical element obtained in the same manner, one active material particle with a largest diameter of 5 μm or more is randomly selected, and the thicknesses of the first coating and the second coating at any five points are measured. The average values of the thickness at these five points are obtained. The average values are regarded as the thickness Ti of the first coating and thickness T2 of the second coating that cover any lithium silicate composite particles.

Figure 2:
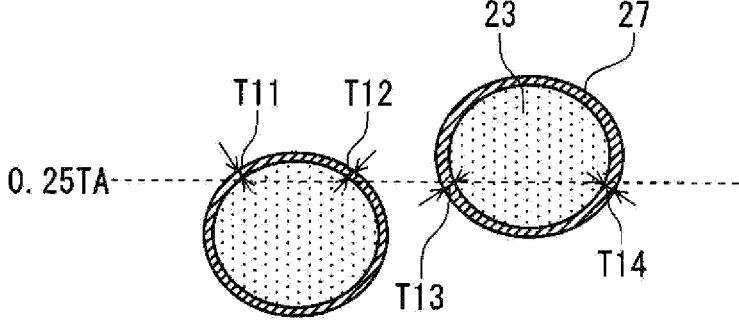
FIG. 2 is a schematic cross sectional view of a further enlarged main portion of the electrochemical element shown in FIG. 1.

FIG. 1 is a schematic cross sectional view of a main portion of the electrochemical element of an embodiment of the present disclosure. FIG. 2 is a schematic cross sectional view of a further enlarged main portion of the electrochemical element shown in FIG. 1.

An electrochemical element 10 includes a current collector 11 and an active material layer 12. The active material layer 12 includes active material particles 20. The active material particles 20 include a lithium silicate composite particle 23 and a first coating 27 covering its surface.

The calculation method of the thickness T1b of the first coating 27 that covers the lithium silicate composite particles 23 at a position of 0.25 TA from the surface of the current collector 11 in the active material layer 12 will now be described, referring to FIG. 2. For convenience, FIG. 2 shows only two lithium silicate composite particles. The thickness T1t can also be calculated in the same manner.

When the active material layer has a thickness TA, 10 lithium silicate composite particles 24 which partially coincided with a straight line drawn at a position of 0.25 TA from the surface of the current collector in the active material layer and which have a largest diameter of 5 μm or more are selected. For each of the particles selected, the thickness (T11, T12, T13, T14 . . . ) of the first coating is measured at one or two points where the above-described straight line crosses the outer edge of the lithium silicate composite particles. An average value of the thicknesses of a maximum of 20 points of these is obtained. After this average value is calculated, an average value is calculated again, excluding data with the value different from the average value by 20% or more. This modified average value is regarded as the thickness T1b of the first coating at a position of 0.25 TA.

Figure 3:
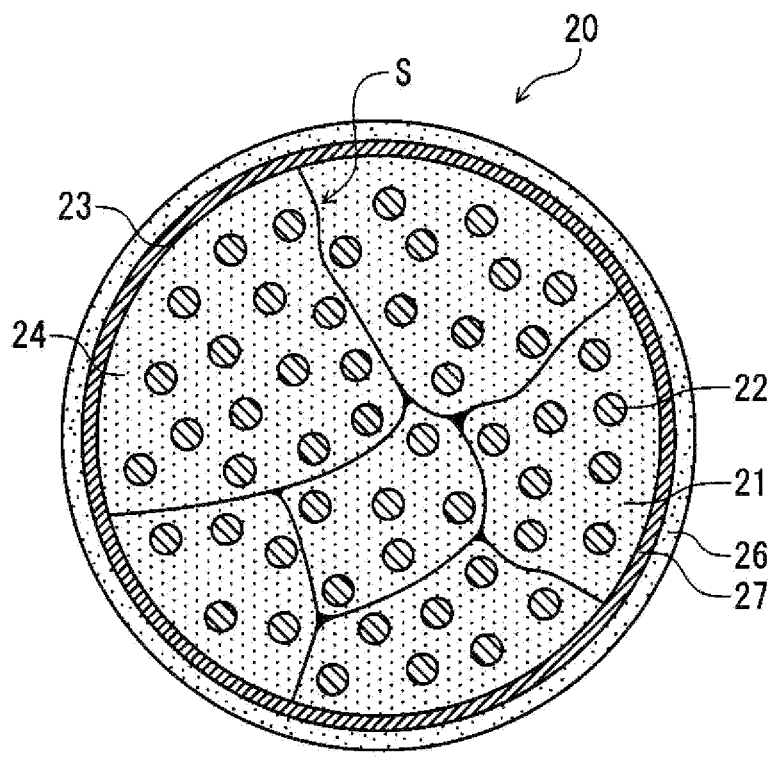
FIG. 3 is a schematic cross sectional view of an active material particle of an embodiment of the present disclosure in detail.

FIG. 3 is a schematic cross sectional view of an example of an active material particle in detail. The lithium silicate composite particle 23 is a secondary particle (mother particle) formed by coagulation of a plurality of primary particles 24. The primary particles 24 each include a silicate phase 21 and silicon particles 22 dispersed in the silicate phase 21. The silicon particles 22 are substantially uniformly dispersed within the silicate phase 21.

A carbon phase is disposed on at least a portion of an interface S of the adjacent primary particles 24. The carbon phase may cover at least a portion of a surface of the silicon particles 22.

The surface of the lithium silicate composite particle (mother particle) 23 is covered with a first coating 27. The first coating 27 is covered with a second coating 26.

B. Electrochemical Device

The electrochemical device according to the embodiment of the present disclosure includes a first electrode, a second electrode, and a separator interposed therebetween. One of the first electrode and the second electrode is composed of the electrochemical element described above. Such an electrochemical device has a high capacity and a long life.

The electrochemical device is a device that transfers electrons between materials and causes chemical reactions to occur by the transfer of electrons. Examples of the electrochemical device include a primary battery, a secondary battery, a condenser, and a double layer capacitor. Preferably, the electrochemical device according to the embodiment of the present disclosure is a lithium ion secondary battery using lithium silicate composite particles as a negative electrode active material.

In the following, configurations are described in detail of embodiments of the present disclosure using a negative electrode as an example of the electrochemical element, and using a lithium ion secondary battery as an example of the electrochemical device.

[Negative Electrode]

The negative electrode includes, for example, a negative electrode current collector and a negative electrode active material layer.

The negative electrode active material layer includes a negative electrode active material. The negative electrode active material includes at least the above-described active material particles (hereinafter, may be referred to as first active material). The negative electrode active material layer is formed as a layer including a negative electrode mixture on the surface of the negative electrode current collector. The negative electrode active material layer may be formed on one surface of the negative electrode current collector or on both surfaces thereof. The negative electrode mixture includes a negative electrode active material as an essential component, and may include a binder, a conductive agent, a thickener, and the like as an optional component.

The negative electrode active material may include yet another active material (hereinafter, sometimes referred to as second active material). Examples of the second active material include a conductive carbon material that electrochemically stores and releases lithium ions. When the first active material and the conductive carbon material are used in combination, a longer life can be expected.

Examples of the conductive carbon material include graphite, soft carbon, hard carbon, and the like. Preferably, graphite having excellent charge/discharge stability and low irreversible capacity is used. Graphite means a material having a graphite type crystal structure, and includes, for example, natural graphite, artificial graphite, graphitized mesophase carbon particles, and the like. A kind of conductive carbon materials may be used singly, or two or more kinds thereof may be used in combination.

The particle size of the conductive carbon material is not particularly limited. The average particle size of the conductive carbon material may be, for example, 1 μm or more and 30 μm or less.

The ratio of the first active material to the sum of the first and second active materials may be, for example, 3 mass % or more and 30 mass % or less. This allows for both high capacity and long life.

As the negative electrode current collector, a non-porous conductive substrate (metal foil, etc.), and a porous conductive substrate (mesh-body, net-body, punched sheet, etc.) are used. For the material of the negative electrode current collector, stainless steel, nickel, nickel alloy, copper, copper alloy, or the like can be exemplified. The thickness of the negative electrode current collector is not particularly limited, but in view of balance between the strength and weight reduction of the negative electrode, it is preferably 1 μm or more and 50 μm or less, and more preferably 5 μm or more and 20 μm or less.

Examples of the binder include at least one selected from the group consisting of polyacrylic acid, polyacrylic acid salt, and derivatives thereof. As the polyacrylic acid salt, a Li salt or a Na salt is preferably used. Preferably, a cross-linked lithium polyacrylate is used.

Examples of the conductive agent include: carbon blacks, such as acetylene black; conductive fibers, such as carbon fibers and metal fibers; fluorinated carbon; powders of metal, such as aluminum; conductive whiskers, such as zinc oxide and potassium titanate; conductive metal oxides, such as titanium oxide; and organic conductive materials, such as phenylene derivatives. A kind of conductive agent may be used singly, or two or more kinds thereof may be used in combination.

Examples of the thickener include carboxymethylcellulose (CMC) and a modified product thereof (also including salts such as Na salts), a cellulose derivative such as methylcellulose (such as cellulose ether); a saponified product of a polymer having a vinyl acetate unit such as polyvinyl alcohol; a polyether (such as polyalkylene oxide such as polyethylene oxide), and the like. A kind of thickener may be used singly, or two or more kinds thereof may be used in combination.

[Positive Electrode]

The positive electrode includes, for example, a positive electrode current collector, and a positive electrode active material layer formed on the surface of the positive electrode current collector. The positive electrode active material layer may be formed on one surface of the positive electrode current collector, or may be formed on both surfaces thereof.

The positive electrode active material layer is formed as a layer including a positive electrode mixture on a surface of the positive electrode current collector. The positive electrode mixture includes a positive electrode active material as an essential component, and may include a binder, a conductive agent, and the like as optional components.

For the positive electrode active material, a lithium composite metal oxide can be used. Examples of the lithium composite metal oxide include $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMePO_4$, and $Li_2MePO_4F$. M is at least one selected from the group consisting of Na, Mg, Sc, Y, Mn, Fe, Co, Ni, Cu, Zn, Al, Cr, Pb, Sb, and B. Me includes at least a transition element (e.g., at least one element selected from the group consisting of Mn, Fe, Co, and Ni). Here, $0 \leq a \leq 1.2$, $0 \leq b \leq 0.9$, and $2.0 \leq c \leq 2.3$ are satisfied.

As the binder and the conductive agent, those exemplified for the negative electrode can be used. As the conductive agent, graphite such as natural graphite or artificial graphite may be used.

The shape and thickness of the positive electrode current collector can be selected from the shapes and ranges according to the negative electrode current collector. Examples of the material of the positive electrode current collector may be stainless steel, aluminum, aluminum alloy, titanium, or the like.

Separator

The separator is interposed between the positive electrode and the negative electrode. The separator is excellent in ion permeability and has suitable mechanical strength and electrically insulating properties. The separator may be, for example, a microporous thin film, a woven fabric, or a nonwoven fabric. The separator is preferably made of, for example, polyolefin such as polypropylene and polyethylene.

Electrolyte

The electrochemical device according to the embodiment of the present disclosure further includes an electrolyte. The electrolyte includes a solvent and a lithium salt dissolved in the solvent. The lithium salt concentration of the electrolyte is, for example, 0.5 mol/L or more and 2 mol/L or less. The electrolyte may contain a known additive.

As the solvent, an aqueous solvent or a nonaqueous solvent is used. As the nonaqueous solvent, for example, a cyclic carbonate, a chain carbonate, a cyclic carboxylate, or the like is used. Examples of the cyclic carbonate include propylene carbonate (PC), ethylene carbonate (EC), and the like. Examples of the chain carbonate include diethyl carbonate (DEC), ethyl methyl carbonate (EMC), and dimethyl carbonate (DMC). Examples of the cyclic carboxylate include γ-butyrolactone (GBL) and γ-valerolactone (GVL). A kind of nonaqueous solvent may be used singly, or two or more kinds thereof may be used in combination.

Examples of the lithium salt include a lithium salt of chlorine containing acid ($LiClO_4$, $LiAlCl_4$, $LiB_{10}Cl_{10}$, etc.), a lithium salt of fluorine containing acid ($LiPF_6$, $LiBF_4$, $LiSbF_6$, $LiAsF_6$, $LiCF_3SO_3$, $LiCF_3CO_2$, etc.), a lithium salt of fluorine containing acid imide ($LiN(SO_2F)_2$, $LiN(CF_3SO_2)_2$, $LiN(CF_3SO_2)(C_4F_9SO_2)$, $LiN(C_2F_5SO_2)_2$, etc.), a lithium halide (LiCl, LiBr, LiI, etc.) and the like. A kind of lithium salt may be used singly, or two or more kinds thereof may be used in combination.

The structure of the secondary battery can be, for example, a structure in which an electrode group formed by winding a positive electrode and a negative electrode with a separator interposed therebetween and an electrolyte are accommodated in an outer case. Alternatively, instead of the wound-type electrode group, a laminated electrode group can be used, in which the positive electrode and the negative electrode are laminated with a separator interposed therebetween. Other forms of electrode group may also be applied. The secondary batteries may be of any form, for example, a cylindrical type, prismatic type, coin type, button type, laminated type, etc.

Figure 4:
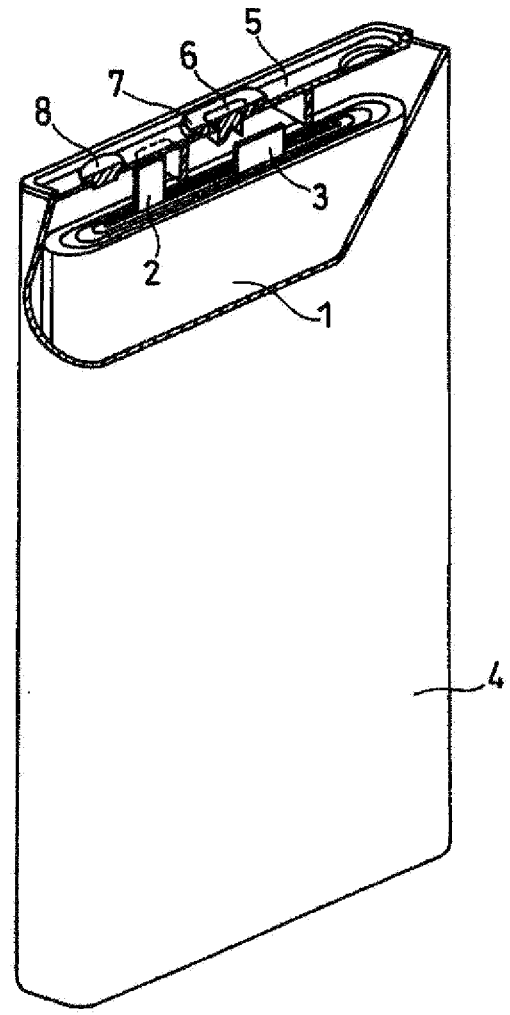
FIG. 4 is a schematic oblique partially cutaway view of a nonaqueous electrolyte secondary battery of an embodiment of the present disclosure.

FIG. 4 is a schematic oblique partially cutaway view of a prismatic secondary battery of an embodiment of the present disclosure. The battery includes a bottomed prismatic battery case 4, an electrode group 1 and an electrolyte contained within the battery case 4, and a sealing plate 5 which seals the opening of the battery case 4. The electrode group 1 has a negative electrode in the form of a long strip, a positive electrode in the form of a long strip, and a separator interposed therebetween. The electrode group 1 is formed by winding the negative electrode, the positive electrode, and the separator around a flat core and removing the core. The sealing plate 5 has an injection port plugged with a sealing plug 8 and a negative electrode terminal 6 insulated from the sealing plate 5 with a gasket 7.

One end of the negative electrode lead 3 is attached to the negative electrode current collector of the negative electrode by welding, etc. One end of the positive electrode lead 2 is attached to the positive electrode current collector of the positive electrode by welding, etc. The other end of the negative electrode lead 3 is electrically connected to the negative electrode terminal 6. The other end of the positive electrode lead 2 is electrically connected to the sealing plate 5. At the upper part of the electrode group 1, a resin made frame is arranged to isolate the electrode group 1 from the sealing plate 5 and to isolate the negative electrode lead 3 from the battery case 4.

C. Method for Producing Electrochemical Element

A method for producing an electrochemical element of an embodiment of the present disclosure includes: a preparation step of preparing lithium silicate composite particles each including a silicate phase and silicon particles dispersed in the silicate phase, a supporting step of supporting the lithium silicate composite particles on a surface of a current collector to form a precursor layer, a rolling step of rolling the precursor layer, and a coating formation step, after the rolling step, of forming a first coating including an oxide of a first element other than a non-metal element on at least a portion of a surface of the lithium silicate composite particles by allowing the lithium silicate composite particles to expose in a gas phase including the first element.

Figure 5:
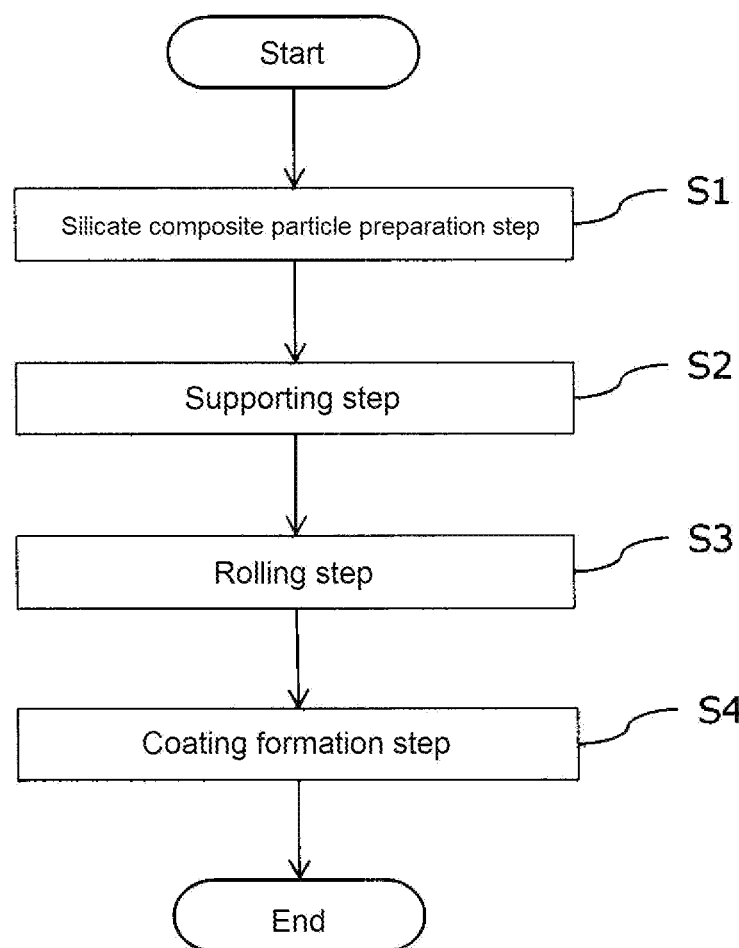
FIG. 5 is a flowchart showing a method of producing an electrochemical element of an embodiment of the present disclosure.

FIG. 5 is a flowchart showing a method of producing active material particles of an embodiment of the present disclosure.

(I) Preparation Step of Lithium Silicate Composite Particles (S1)

(I-i) Preparation of Silicon Particles

First, silicon particles are prepared.

The silicon particles can be obtained by chemical vapor deposition (CVD), thermal plasma method, physical grinding, or the like. In the method described below, for example, silicon nanoparticles having an average particle size of 10 to 200 nm can be synthesized. The average particle size of the silicon particles means the particle size (volume average particle size) at which volume integrated value is 50% in volume particle size distribution measured by a laser diffraction scattering method.

(a) Chemical Gas Phase Deposition Method

In a CVD method, for example, silicon particles are formed by oxidizing or reducing a silane compound in a gas phase. The reaction temperature may be set to, for example, 400° C. or more and 1300° C. or less.

As the silane compound, a hydrogenated silicon such as silane or disilane, halogenated silane, alkoxysilane, or the like can be used. As the halogenated silane, dichloro silane, trichloro silane, tetrachloro silane, or the like can be used. As the alkoxysilane, tetramethoxy silane, tetraethoxy silane, tetrabutoxy silane, or the like can be used.

When hydrogenated silane is contacted with an oxidizing gas in, for example, a gas phase, a composite of silicon particles and silicon oxide particles is obtained. That is, the gas phase atmosphere may be an oxidizing gas atmosphere. Silicon oxide is removed, for example, by washing the composite with hydrofluoric acid, and silicon particles are obtained.

When reducing halogenated silane or alkoxysilane, a molten metal formed into fine particles by, for example, an atomizing process may be contacted with the silane compound. As the molten metal, Na, K, Mg, Ca, Zn, Al, or the like can be used. For the atomization gas, an inert gas, halogenated silane, a hydrogen gas, or the like may be used. That is, the gas phase atmosphere may be an inert gas atmosphere or a reducing gas atmosphere.

(b) Thermal Plasma Method

The thermal plasma method is a method in which a raw material of silicon is introduced into a generated thermal plasma to generate silicon particles in a high-temperature plasma. The thermal plasma may be generated by arc discharge, high frequency discharge, microwave discharge, laser beam irradiation, or the like. Among them, high frequency (RF) discharge is desirable in that it is non-pole discharge and the silicon particles are not contaminated with impurities easily.

For example, silicon oxide can be used as the raw material. When the raw material is introduced into plasma, silicon and oxygen in the form of atoms or ions are instantaneously formed, and silicon is combined and solidified to form silicon particles during cooling.

(c) Physical Grinding

Physical grinding (mechanical milling) is a method in which coarse particles of silicon are ground with a grinder such as ball mill or bead mill. The inside of the grinder may be, for example, an inert gas atmosphere.

(I-ii) Covering Silicon Particles with Carbon Phase

At least a portion of a surface of each silicon particle may be covered with a carbon phase.

Examples of the method of covering the silicon particles with a carbon phase include chemical vapor deposition method (CVD), sputtering, atomic layer deposition method (ALD), wet blending, dry blending, and the like. Preferably, CVD and wet blending methods are used.

(a) Chemical Gas Phase Deposition Method

In the CVD method, silicon particles are introduced into a hydrocarbon based gas atmosphere, and heated to deposit carbon materials generated by thermal decomposition of the hydrocarbon based gas on the particle surface, thereby forming a carbon phase. The temperature of the hydrocarbon based gas atmosphere may be, for example, 500° C. or more and 1000° C. or less. As the hydrocarbon based gas, a chain hydrocarbon gas such as acetylene or methane, aromatic hydrocarbons such as benzene, toluene, or xylene can be used.

(b) Wet Blending Method

In the wet blending method, a carbon precursor such as, for example, coal pitch, petroleum pitch, or tar is dissolved in a solvent, and the obtained solution and silicon particles are mixed and dried. Afterwards, the silicon particles covered with the carbon precursor are heated in an inert gas atmosphere, for example, at 600° C. or less, or 1000° C. or less, to carbonize the carbon precursor to form a carbon phase.

(I-iii) Synthesis of Lithium Silicate Composite Particles

A raw material of a silicate phase is prepared.

For the raw material of the silicate phase, a raw material mixture having a raw material Si and a raw material Li at a predetermined ratio can be used. The raw material mixture is dissolved and the melt is passed through a metal roll and flaked, to obtain silicate. Silicate may also be synthesized by solid phase reaction by baking at a temperature of melting point or less without dissolving the raw material mixture.

For the raw material Si, silicon oxide (e.g., $SiO_2$) is used. As the raw material Li or the raw material element M, a carbonate, an oxide, a hydroxide, a hydride, a nitrate, a sulfate, or the like of lithium or element M can be used, respectively. Preferably, carbonate, oxide, hydroxide, and the like are used.

Silicate is then blended with silicon particles with at least a portion of each of their surfaces covered with a carbon phase (hereinafter, also referred to as carbon covered silicon particles) to mix them. The lithium silicate composite particles are made through steps of, for example, the following.

First, the carbon covered silicon particles and a powder of silicate are mixed at a mass ratio of, for example, 20:80 to 95:5.

A device such as a ball mill is then used to agitate the mixture of the carbon covered silicon particles and silicate. At this time, preferably, an organic solvent is added to the mixture for wet blending. A predetermined amount of an organic solvent may be introduced into the grinding vessel at a time at an initial stage of grinding, or may be intermittently introduced into the grinding vessel dividedly a plurality of times in the grinding process. The organic solvent serves to prevent the object to be ground from adhering to the inner wall of the grinding vessel. As the organic solvent, an alcohol, ether, fatty acid, alkane, cycloalkane, silicate ester, metal alkoxide, or the like can be used.

Subsequently, the mixture is heated at 450° C. or more and 1000° C. or less under increased pressure in, for example, an inert gas atmosphere (e.g., an atmosphere of argon or nitrogen) and sintered. For the sintering, a sintering device capable of pressing under an inert atmosphere, such as hot press, discharge plasma sintering, and the like can be used. Upon sintering, silicate melts and flows to fill the gaps between the silicon particles. As a result, a dense block sintered product having a silicate phase as a sea-portion, and silicon particles as an island-portion can be obtained.

Finally, the sintered product obtained is ground to obtain lithium silicate composite particles. By appropriately selecting the grinding conditions, the lithium silicate composite particles having a predetermined average particle size can be obtained.

(I-iv) Covering Lithium Silicate Composite Particles with Carbon Coating

At least a portion of the surface of the lithium silicate composite particles can be covered with a carbon coating. The carbon atoms contained in the first coating are derived from this carbon coating.

The carbon coating can be formed on the surface of the lithium silicate composite particles by, for example, a chemical vapor deposition method using a chain hydrocarbon gas such as acetylene or methane as a raw material; or by mixing the lithium silicate composite particles with coal pitch, petroleum pitch, phenol resin, or the like, and heating the mixture to carbonize. Carbon black may be attached to the surface of the lithium silicate composite particles.

Preferably, the carbon coating should be so thin that it does not substantially affect the average particle size of the lithium silicate composite particles. On the other hand, considering that it is a carbon source of the first coating, it is desirable that the thickness of the carbon coating is more than that of the first coating. The carbon coating may be 0.1 nm or more, or 1 nm or more. Considering the diffusivity of lithium ions, the carbon coating is preferably 300 nm or less, and more preferably 200 nm or less. The thickness of the carbon coating can be measured by observing the cross sections of the lithium silicate composite particles using SEM or TEM as in the case of the first coating.

Finally, a step may be performed in which the lithium silicate composite particles having the carbon coating are washed with an acid. By washing the composite particles with, for example, an acidic aqueous solution, an alkaline component of a trace amount which may be present on the surface of the lithium silicate composite particles can be dissolved and removed. As the acidic aqueous solution, an aqueous solution of an inorganic acid such as hydrochloric acid, hydrofluoric acid, sulfuric acid, nitric acid, phosphoric acid, or carbonic acid, or an aqueous solution of an organic acid such as citric acid or acetic acid can be used.

(II) Supporting Step of Lithium Silicate Composite Particles (S2)

A slurry in which a negative electrode mixture containing the prepared lithium silicate composite particles dispersed in a dispersion medium is applied to the surface of a current collector, and the slurry is dried. A precursor layer of the active material layer is formed on the surface of the current collector in this manner.

The dispersion medium is not particularly limited, and for example, water, an alcohol such as ethanol, ether such as tetrahydrofuran, an amide such as dimethylformamide, N-methyl-2-pyrrolidone (NMP), or a mixture solvent thereof is used.

(III) Rolling Step (S3)

After drying the slurry, the precursor layer for the active material layer is rolled.

The rolling conditions are not particularly limited. Preferably, the rolling is performed so as to give the precursor layer a density of 0.9 g/cm$^3$ or more and 1.8 g/cm$^3$ or less, preferably 1.0 g/cm$^3$ or more and 1.8 g/cm$^3$ or less. In this case, the precursor layer is not rolled excessively, and densification at particularly the outer surface side of the active material layer precursor is suppressed. Therefore, in the coating formation step, the gas phase including the first element can make more contacts with the lithium silicate composite particles near the outer surface of the active material layer. Therefore, a thicker first coating is easily formed on the lithium silicate composite particles that are relatively distant from the current collector surface.

(IV) First Coating Formation Step (S4)

The lithium silicate composite particles are exposed to a gas phase including the first element. In this manner, a first coating including an oxide of the first element is formed on at least a portion of the surface of the lithium silicate composite particles.

When the lithium silicate composite particles have a carbon coating, with this step, the first element is introduced into the carbon coating, and the first coating containing the oxide of the first element and the carbon atom is formed.

Examples of the gas phase method include CVD method, ALD method, physical vapor deposition (PVD) method, etc. Preferably, the ALD method is used because the ALD method can form a first coating in a relatively low temperature. According to the ALD method, the first coating can be formed in an atmosphere of 200° C. or less.

In the ALD method, an organometallic compound (precursor) containing the first element is used as a raw material of the first coating. In the ALD method, a vaporized precursor (a raw material gas) and an oxidizer are alternately supplied to a reaction chamber in which an object is placed. As a result, a layer including the oxide of the first element is formed on the surface of the object.

If at least a portion of the surface of the object of the lithium silicate composite particles is covered with the carbon coating, the first element contained in the raw material gas can pass through this carbon coating to reach the surface of the lithium silicate composite particles. Then, the first element is deposited as it is on the surface of the lithium silicate composite particles. Therefore, the first element is more likely to be placed in the vicinity of the surface of the lithium silicate composite particles. In this instance, the first coating to be formed includes a carbon atom from the carbon coating along with the oxide of the first element.

In the ALD method, self-limiting works, and therefore the first element is deposited on the surface of the object by an atomic layer. In the ALD method, the overall thickness of the first coating is controlled by the number of cycles, setting the following as 1 cycle: supply (pulse) of the raw material gas→exhaust (purge) of the raw material gas→supply (pulse) of the oxidizer→exhaust (purge) of the oxidizer.

When the carbon coating is present, controlling the thickness of the first coating to be the same as that of the carbon coating may place the oxide of the first element throughout the carbon coating. When the thickness of the first coating is controlled to be thinner than that of the carbon coating, the first coating including the oxide of the first element and the carbon atom is formed on the surface side of the lithium silicate composite particles, and a second coating derived from the remainder of the carbon coating is formed so as to cover this first coating.

The precursor is an organometallic compound containing the first element. As the precursor, various types of organometallic compound conventionally used in the ALD method can be used.

Examples of the precursor containing Ti include bis(t-butylcyclopentadienyl)titanium(IV) dichloride ($C_{18}H_{26}C_{12}Ti$), tetrakis(dimethylamino) titanium(IV) ($[(CH_3)_2N]_4Ti$, TDMAT), tetrakis(diethylamino) titanium (IV)($[(C_2H_5)_2N]_4Ti$), tetrakis(ethylmethylamino) titanium (IV)($Ti[N(C_2H_5)(CH_3)]_4$), titanium(IV)(diisopropoxide-bis (2,2,6,6-tetramethyl-3,5-heptanedionate)($Ti[OCC(CH_3)_3$ $CHCOC(CH_3)_3]_2(OC_3H_7)_2$), titanium tetrachloride($TiCl_4$), titanium(IV) isopropoxide($Ti[OCH(CH_3)_2]_4$), and titanium (IV) ethoxide($Ti[O(C_2H_5)]_4$). Examples of the precursor containing Al include trimethyl aluminum (($(CH_3)_3Al$, TMA).

The raw material gas may include a plurality of precursors. The reaction chamber may be supplied with different types of precursors simultaneously or sequentially. Alternatively, the type of precursor included in the raw material gas may be changed for each cycle.

As the oxidizer, an oxidizer conventionally used in the ALD method can be used. Examples of the oxidizer include water, oxygen, ozone, etc. The oxidizer may be supplied to the reaction chamber as a plasma using an oxidizer as a raw material.

The conditions for the ALD method are not particularly limited. The temperature of the atmosphere containing the precursor or oxidizer may be 10° C. or more and 200° C. or less, or 25° C. or more and 200° C. or less, because the first coating is more likely to be formed thicker on the lithium silicate composite particles in the vicinity of the current collector. For the same reason, the pressure of the reaction chamber during the processing may be $1\times10^{-5}$ Pa or more and $1\times10^5$ Pa or less, or $1\times10^{-4}$ Pa or more and $1\times10^4$ Pa or less.

When the temperature of the atmosphere containing the precursor or oxidizer in the reaction chamber is 10° C. or more and 200° C. or less, and the pressure of the reaction chamber during the processing is $1\times10^{-5}$ Pa or more and $1\times10^5$ Pa or less, the pulse time of the raw material gas may be 0.01 seconds or more, or 0.05 seconds or more in that the first coating is more likely to be formed thicker on the lithium silicate composite particles near the current collector. The pulse time of the raw material gas may be 5 seconds or less or 3 seconds or less.

After the first coating is formed, the active material layer may be rolled. The conditions for the rolling are not particularly limited, and the active material layer may be appropriately set to achieve a predetermined thickness or density.

Hereinafter, the present disclosure will be specifically described based on Examples and Comparative Examples, but the present disclosure is not limited to the following Examples.

Example 1

[Negative Electrode Production]
(1) Preparation of Silicon Particles

Coarse particles of silicon (3N, average particle size 10 μm) were put into a pot (made of SUS, volume: 500 mL) of a planetary ball mill (manufactured by Fritsch Co., Ltd., P-5), and 24 balls made of SUS (diameter: 20 mm) were placed in the pot. The lid was closed, and the mixture was subjected to grinding at 200 rpm to an average particle size of 150 nm, thereby preparing silicon particles.

(2) Covering of Silicon Particles with Carbon Phase

A carbon material was deposited on the surface of the silicon particles by chemical vapor deposition. Specifically, silicon particles were introduced into an acetylene gas atmosphere and heated at 700° C. to thermally decompose the acetylene gas and deposit on the surface of the silicon particles to form a carbon phase. The amount of the carbon material relative to 100 parts by mass of the silicon particles was 10 parts by mass.

(3) Preparation of Lithium Silicate Composite Particles

Silicon dioxide was mixed with lithium carbonate so that the atomic ratio (=Si/Li) was 1.05, and the mixture was baked at 950° C. in air for 10 hours, thereby producing lithium silicate represented by $Li_2Si_2O_5$ (z=0.5). The obtained lithium silicate was ground to give an average particle size of 10 μm.

The lithium silicate ($Li_2Si_2O_5$) with an average particle size of 10 μm was mixed with the carbon covered silicon at a mass ratio of 70:30. The mixture was put into a pot (made of SUS, volume: 500 mL) of a planetary ball mill (manufactured by Fritsch Co., Ltd., P-5), and 24 balls made of SUS (diameter: 20 mm) were placed in the pot. The lid was closed, and the mixture was subjected to grinding at 200 rpm for 50 hours in an inert atmosphere.

Next, the powdery mixture was taken out in an inert atmosphere, and baked for 4 hours at 800° C. in an inert atmosphere with a pressure applied by a hot press to obtain a sintered product of the mixture. Afterwards, the sintered product was ground to give lithium silicate composite particles.

The crystallite size of the silicon particles calculated by the Scherrer equation from the diffraction peak attributed to the Si(111) plane by XRD-analysis was 15 nm. In the silicate phase, the Si/Li ratio was 1.0, and the $Li_2Si_2O_5$ content measured by Si-NMR was 70 mass % (silicon particle content was 30 mass %).

(4) Covering of Lithium Silicate Composite Particles with Carbon Coating

The obtained lithium silicate composite particles were passed through a 40-μm-mesh, mixed with coal pitch (MCP250, JFE Chemical Co., Ltd.), and the mixture of the lithium silicate composite particles and pitch was baked for 5 hours at 800° C. in an inert atmosphere to form a carbon coating on the surface of the lithium silicate composite particles. The amount of the coating by the carbon coating was 5 mass % relative to the total mass of the lithium silicate composite particles and the carbon coating. Afterwards, a sieve was used to obtain particles with an average particle size of 10 μm including the lithium silicate composite particles and the carbon coating formed on its surface. The thickness of the carbon coating was 50 nm.

(5) Preparation of Negative Electrode Precursor

The lithium silicate composite particles with the carbon coating and a second active material (graphite) were mixed at a mass ratio of 5:95 and used as a negative electrode active material. To the negative electrode mixture containing the negative electrode active material, sodium carboxymethyl-cellulose (CMC-Na), styrene-butadiene rubber (SBR), and polyacrylic acid lithium salt at a mass ratio of 96.5:1:1.5:1, water was added, and then stirred using a mixer (T. K. HIVIS MIX, manufactured by PRIMIX Corporation) to prepare a negative electrode slurry. Next, the negative electrode slurry was applied to the surface of the copper foil so that the mass of the negative electrode material mixture per 1 $m^2$ was 190 g, the coating was dried, thereby forming a precursor layer. Afterwards, rolling was performed so that the precursor layer had a density of 1.1 $g/cm^3$. The precursor layer had a thickness of 202 μm.

(6) Formation of First and Second Coatings

The negative electrode precursor was placed in a predetermined reaction chamber and a first coating was formed on the surface of the negative electrode precursor by the ALD method according to the procedures described below.

A precursor (TDMAT) serving as a source of a first element (Ti) was vaporized and supplied to the reaction chamber containing the negative electrode precursor. The pulse time was set to 0.1 seconds. The temperature of the atmosphere containing the precursor in the reaction chamber was controlled to be 200° C., and the pressure of the atmosphere was controlled to be 260 Pa. After 30 seconds, the excess precursor was purged with nitrogen gas so that the surface of the negative electrode precursor was covered with a single molecule layer of the precursor.

Next, the reaction chamber in which the negative electrode precursor was placed was supplied with a vaporized oxidizer ($H_2O$). The pulse time was set to 0.015 seconds. The temperature of the atmosphere containing the oxidizer was controlled to be 200° C., and the pressure of the atmosphere was controlled to be 260 Pa. After 30 seconds, the excess oxidizer was purged with nitrogen gas.

A first coating containing titanium was formed by repeating a series of operations 400 times: supplying the precursor, purging, supplying the oxidizer, and purging. The first coating was adjusted to be thinner than the carbon coating to simultaneously form a first coating and a second coating covering the first coating.

The first coating was analyzed by SEM, EDS, ICP, etc. The first coating contained Ti and C. The thickness T1b of the first coating that covers the lithium silicate composite particles at a position of 0.25 TA from the surface of the current collector in the active material layer was 6 nm. The thickness T1t of the first coating that covers the lithium silicate composite particles at a position of 0.75 TA from the surface of the current collector in the active material layer was 20 nm. The average thickness $T1_A$ of the first coating was 13 nm.

In the first coating that covers the lithium silicate composite particles at a position of 0.25 TA from the surface of the current collector in the active material layer, the concentration Cb of the first element at a position of 0.25 T1 from the surface of the lithium silicate composite particles in the first coating was 6%. In the same first coating, the concentration Ct of the first element at a position of 0.75 T1A from the surface of the lithium silicate composite particle in the first coating was 2%.

In the first coating that covers the lithium silicate composite particles at a position of 075 TA from the surface of the current collector in the active material layer, the concentration Cb of the first element at a position of 0.25 T1 from the surface of the lithium silicate composite particles in the first coating was 3%. In the same first coating, the concentration Ct of the first element at a position of 0.75 T1A from the surface of the lithium silicate composite particle in the first coating was 0.5%.

The minimum value of the element ratio R of the first element relative to the carbon atom was 0.03, and the maximum value was 8. The element ratio Rb of the first element relative to the carbon atom at a position of 0.25 $T1_A$ of the first coating from the surface of the lithium silicate composite particle was 6.2. The element ratio Rt of the first element relative to the carbon atom at a position of 0.75 $T1_A$ of the first coating from the surface of the lithium silicate composite particle was 0.08.

The composition of the second coating was analyzed in the same manner, and the second coating contained C. In each of the lithium silicate composite particles, a total of the first coating thickness and the second coating thickness was 50 nm.

The thickness Ti of the first coating that covers the lithium silicate composite particles at a position of 0.5 TA from the current collector in the active material layer was 6 nm, the thickness of the second coating was 44 nm, and a total of the first coating thickness and the second coating thickness was 50 nm.

[Positive Electrode Production]

To the positive electrode mixture containing lithium cobaltate, acetylene black, and polyvinylidene fluoride at a mass ratio of 95:2.5:2.5, N-methyl-2-pyrrolidone (NMP) was added, and stirred using a mixer (T. K. HIVIS MIX, manufactured by PRIMIX Corporation) to prepare a positive electrode slurry. Then, the positive electrode slurry was applied on an aluminum foil surface, and dried and rolled, thereby producing a positive electrode with a positive electrode active material layer with a density of 3.6 $g/cm^3$ formed on both sides of the aluminum foil. The thickness of the positive electrode active material layer was 138 μm.

[Preparation of Electrolyte]

An electrolyte was prepared by dissolving $LiPF_6$ in a mixed solvent containing ethylene carbonate (EC) and diethyl carbonate (DEC) with a volume ratio of 3:7 at a concentration of 1.0 mol/L.

[Secondary Battery Production]

A tab was attached to the electrodes, and an electrode group was produced by winding the positive electrode and the negative electrode spirally with a separator interposed so that the tabs were positioned at the outermost peripheral portion. The electrode group was inserted into an exterior body made of an aluminum laminate film, dried in vacuo at 105° C. for 2 hours, and then the electrolyte was injected thereinto. The opening of the exterior body was sealed to obtain a secondary battery A1.

Example 2

A first active material was produced in the same manner as in Example 1 to produce a secondary battery A2, except that in the formation of the first and second coatings (6), the series of operations was repeated 100 times: supplying a precursor, purging, supplying an oxidizer, and purging.

The first coating and the second coating were analyzed in the same manner as in Example 1. The first coating that covers the lithium silicate composite particles contained Ti and C, and the first coating that covers the electrically conductive carbon material contained Ti. The second coating contained C.

The thickness T1b of the first coating that covers the lithium silicate composite particles at a position of 0.25 TA from the surface of the current collector in the active material layer was 6 nm. The thickness T1t of the first coating that covers the lithium silicate composite particles at a position of 0.75 TA from the surface of the current collector in the active material layer was 10 nm. The average thickness $T1_A$ of the first coating was 8 nm. In each of the lithium silicate composite particles, a total of the first coating thickness and the second coating thickness was 50 nm.

The thickness Ti of the first coating that covers the lithium silicate composite particles at a position of 0.5 TA from the current collector in the active material layer was 6 nm and the second coating thickness T2 was 44 nm.

It was confirmed that in the first coating, the relation of the concentration Cb and the concentration Ct, and the relation of the element ratio Rb and the element ratio Rt were the same as those in Example 1.

Example 3

A first active material was produced in the same manner as in Example 1 to produce a secondary battery A3, except that in the formation of the first and second coatings (6), the series of operations was repeated 300 times: supplying a precursor, purging, supplying an oxidizer, and purging.

The first coating and the second coating were analyzed in the same manner as in Example 1. The first coating that covers the lithium silicate composite particles contained Ti and C, and the first coating that covers the electrically conductive carbon material contained Ti. The second coating contained C.

The thickness T1b of the first coating that covers the lithium silicate composite particles at a position of 0.25 TA from the surface of the current collector in the active material layer was 3 nm. The thickness T1t of the first coating that covers the lithium silicate composite particles at a position of 0.75 TA from the surface of the current collector in the active material layer was 20 nm. The average thickness $T1_A$ of the first coating was 11.5 nm. In each of the lithium silicate composite particles, a total of the first coating thickness and the second coating thickness was 50 nm.

The thickness Ti of the first coating that covers the lithium silicate composite particles at a position of 0.5 TA from the current collector in the active material layer was 3 nm and the second coating thickness T2 was 47 nm.

It was confirmed that in the first coating, the relation of the concentration Cb and the concentration Ct, and the relation of the element ratio Rb and the element ratio Rt were the same as those in Example 1.

Example 4

A first active material was produced in the same manner as in Example 1 to produce a secondary battery A4, except that in the formation of the first and second coatings (6), the series of operations was repeated 70 times: supplying a precursor, purging, supplying an oxidizer, and purging.

The first coating and the second coating were analyzed in the same manner as in Example 1. The first coating that covers the lithium silicate composite particles contained Ti and C, and the first coating that covers the electrically conductive carbon material contained Ti. The second coating contained C.

The thickness T1b of the first coating that covers the lithium silicate composite particles at a position of 0.25 TA from the surface of the current collector in the active material layer was 3 nm. The thickness T1t of the first coating that covers the lithium silicate composite particles at a position of 0.75 TA from the surface of the current collector in the active material layer was 10 nm. The average thickness $T1_A$ of the first coating was 6.5 nm. In each of the lithium silicate composite particles, a total of the first coating thickness and the second coating thickness was 50 nm.

The thickness Ti of the first coating that covers the lithium silicate composite particles at a position of 0.5 TA from the current collector in the active material layer was 3 nm and the second coating thickness T2 was 47 nm.

It was confirmed that in the first coating, the relation of the concentration Cb and the concentration Ct, and the relation of the element ratio Rb and the element ratio Rt were the same as those in Example 1.

Example 5

A first active material was produced in the same manner as in Example 1 to produce a secondary battery A5, except that in the formation of the first and second coatings (6), the series of operations was repeated 50 times: supplying a precursor, purging, supplying an oxidizer, and purging.

The first coating and the second coating were analyzed in the same manner as in Example 1. The first coating that covers the lithium silicate composite particles contained Ti and C, and the first coating that covers the electrically conductive carbon material contained Ti. The second coating contained C.

The thickness T1b of the first coating that covers the lithium silicate composite particles at a position of 0.25 TA from the surface of the current collector in the active material layer was 1 nm. The thickness T1t of the first coating that covers the lithium silicate composite particles at a position of 0.75 TA from the surface of the current collector in the active material layer was 10 nm. The average thickness $T1_A$ of the first coating was 5.5 nm. In each of the lithium silicate composite particles, a total of the first coating thickness and the second coating thickness was 50 nm.

The thickness Ti of the first coating that covers the lithium silicate composite particles at a position of 0.5 TA from the current collector in the active material layer was 1 nm and the second coating thickness T2 was 49 nm.

It was confirmed that in the first coating, the relation of the concentration Cb and the concentration Ct, and the relation of the element ratio Rb and the element ratio Rt were the same as those in Example 1.

Example 6

A first active material was produced in the same manner as in Example 1 to produce a secondary battery A6, except that in the covering of the lithium silicate composite particles with the carbon coating (5), the carbon coating thickness was set to 100 nm, and in the formation of the first and second coatings (6), the series of operations was repeated 300 times: supplying a precursor, purging, supplying an oxidizer, and purging.

The first coating and the second coating were analyzed in the same manner as in Example 1. The first coating that covers the lithium silicate composite particles contained Ti and C, and the first coating that covers the electrically conductive carbon material contained Ti. The second coating contained C.

The thickness T1b of the first coating that covers the lithium silicate composite particles at a position of 0.25 TA from the surface of the current collector in the active material layer was 3 nm. The thickness T1t of the first coating that covers the lithium silicate composite particles at a position of 0.75 TA from the surface of the current collector in the active material layer was 20 nm. The average thickness $T1_A$ of the first coating was 11.5 nm. In each of the lithium silicate composite particles, a total of the first coating thickness and the second coating thickness was 100 nm.

The thickness Ti of the first coating that covers the lithium silicate composite particles at a position of 0.5 TA from the current collector in the active material layer was 3 nm and the second coating thickness T2 was 97 nm.

It was confirmed that in the first coating, the relation of the concentration Cb and the concentration Ct, and the relation of the element ratio Rb and the element ratio Rt were the same as those in Example 1.

Example 7

A first active material was produced in the same manner as in Example 1 to produce a secondary battery A7, except that in the covering of the lithium silicate composite particles with the carbon coating (5), the carbon coating thickness was set to 100 nm, and in the formation of the first and second coatings (6), the series of operations was repeated 70 times: supplying a precursor, purging, supplying an oxidizer, and purging.

The first coating and the second coating were analyzed in the same manner as in Example 1. The first coating that covers the lithium silicate composite particles contained Ti and C, and the first coating that covers the electrically conductive carbon material contained Ti. The second coating contained C.

The thickness T1b of the first coating that covers the lithium silicate composite particles at a position of 0.25 TA from the surface of the current collector in the active material layer was 3 nm. The thickness T1t of the first coating that covers the lithium silicate composite particles at a position of 0.75 TA from the surface of the current collector in the active material layer was 10 nm. The average thickness $T1_A$ of the first coating was 5.5 nm. In each of the lithium silicate composite particles, a total of the first coating thickness and the second coating thickness was 100 nm.

The thickness Ti of the first coating that covers the lithium silicate composite particles at a position of 0.5 TA from the current collector in the active material layer was 3 nm and the second coating thickness T2 was 97 nm.

It was confirmed that in the first coating, the relation of the concentration Cb and the concentration Ct, and the relation of the element ratio Rb and the element ratio Rt were the same as those in Example 1.

Comparative Example 1

An active material was produced in the same manner as in Example 1 to produce a secondary battery B1, except that the covering of the lithium silicate composite particles with the carbon coating (4) and the formation of the first coating (6) were not performed.

Comparative Example 2

An active material was produced in the same manner as in Example 1 to produce a secondary battery B2, except that the formation of the first and the second coatings (6) was not performed. The thickness of the carbon coating was 50 nm.

Comparative Example 3

An active material was produced in the same manner as in Example 1 to produce a secondary battery B3, except that the covering of the lithium silicate composite particles with the carbon coating (4) was not performed, and instead of the formation of the first and second coatings (6), the lithium silicate composite particles before being supported by copper foil were subjected to a treatment using an ALD method.

The treatment using the ALD method on the silicate composite particles was performed under the same conditions as in Example 1, except that a series of operations was repeated 100 times: supplying a precursor, purging, supplying an oxidizer, and purging. The thickness T1b of the first coating that covers the lithium silicate composite particles at a position of 0.25 TA from the surface of the current collector in the active material layer and the thickness T1t of the first coating that covers the lithium silicate composite particles at a position of 0.75 TA from the surface of the current collector in the active material layer were the same, i.e., 10 nm.

[Initial Charge/Discharge]

The batteries were subjected to constant current charging at 25° C. at a current of 1 C until the battery voltage reached 4.2 V, and then to constant voltage charging at a voltage of 4.2 V until the current reached 1/20 C. After 10 minutes of rest, the batteries were subjected to constant current discharging at a current of 1 C until the voltage reached 2.75 V.

[Charge/Discharge Cycle Test]

Charge/discharge was repeated under the following conditions.

<Charge>

Constant current charging was performed at 25° C. at a current of 1 C until the voltage reached 4.2 V, and constant voltage charging was performed at a voltage of 4.2 V until the current reached 1/20 C.

<Discharge>

Constant current discharging was performed at 25° C. at a current of 1 C until the voltage reached 2.75 V.

The resting time was 10 minutes between the charging and discharging. The ratio of the discharge capacity at the 100th cycle to the discharge capacity of the 1st cycle was calculated, and an average value for the 20 batteries was obtained. This average value was regarded as a capacity retention rate. Table 1 shows the evaluation results.

[Expansion Rate]

After producing the above-described negative electrode, the thickness was measured. An average of the thickness at any five points was regarded as the negative electrode thickness. The thickness $T_0$ was determined for 20 negative electrodes.

After the above-described charge/discharge cycle test, the batteries were disassembled to take out the negative electrodes, and their thicknesses were determined. An average of the thickness at any five points was regarded as the negative electrode thickness after charge/discharge cycles. The thickness $T_A$ was determined for 20 negative electrodes after charge/discharge cycles.

For the 20 negative electrodes, the thickness $T_0$ was deducted from the thickness $T_A$, and then divided by the thickness $T_0((T_A-T_0)/T_0)$; the result was averaged to be regarded as an expansion rate. Table 1 shows the evaluation results.

TABLE 1

| Battery | First element | First coating thickness T1b at 0.25 TA/nm | First coating thickness T1t at 0.75 TA/nm | Expansion rate/% | Capacity retention rate/% |
|---------|---------------|-------------------------------------------|-------------------------------------------|------------------|---------------------------|
| A1 | Ti | 6 | 20 | 118 | 86 |
| A2 | Ti | 6 | 10 | 125 | 93 |
| A3 | Ti | 3 | 20 | 129 | 91 |
| A4 | Ti | 3 | 10 | 125 | 94 |
| A5 | Ti | 1 | 10 | 131 | 87 |
| A6 | Ti | 3 | 20 | 128 | 83 |
| A7 | Ti | 3 | 10 | 126 | 90 |
| B1 | — | — | — | 152 | 80 |
| B2 | — | — | — | 150 | 81 |
| B3 | Ti | 10 | 10 | 148 | 85 |

Table 1 shows that in the batteries A1 to A7, the negative electrode expansion was suppressed without reducing the capacity retention rate.

INDUSTRIAL APPLICABILITY

The present disclosure can provide a high capacity, long life electrochemical device. The electrochemical device of the present disclosure is useful for a main power source of mobile communication device, mobile electronic device, etc.

REFERENCE SIGNS LIST

1 Electrode Group
2 Positive Electrode Lead
3 Negative Electrode Lead
4 Battery Case
5 Sealing Plate
6 Negative Electrode Terminal
7 Gasket
8 Sealing Plug
10 Electrochemical element
11 Current collector
12 Active material layer
20 Active Material Particle
21 Silicate Phase
22 Silicon Particle
23 Lithium Silicate Composite Particle
24 Primary Particle
26 Second Coating
27 First Coating

The invention claimed is:

1. An electrochemical element comprising a current collector, and an active material layer supported on the current collector, wherein
   the active material layer includes active material particles,
   the active material particles each include a lithium silicate composite particle including a lithium silicate phase and silicon particles dispersed in the lithium silicate phase, and a first coating that covers at least a portion of a surface of the lithium silicate composite particle,
   the first coating includes an oxide of a first element other than a non-metal element, and
   the active material layer has a thickness TA, and T1b<T1t is satisfied, where T1b is a thickness of the first coating that covers the lithium silicate composite particle at a position of 0.25TA from the surface of the current collector in the active material layer, and
   T1t is a thickness of the first coating that covers the lithium silicate composite particle at a position of 0.75TA from the surface of the current collector in the active material layer.

2. The electrochemical element of claim 1, wherein the thickness T1b and the thickness T1t satisfy $0.02 \leq T1b/T1t < 1$.

3. The electrochemical element of claim 1, wherein the first element includes at least one element selected from the group consisting of Group 3 elements, Group 4 elements, Group 5 elements, and Group 6 elements of a periodic table.

4. The electrochemical element of claim 1, wherein the first element includes at least one selected from the group consisting of Al, Ti, Si, Zr, Mg, Nb, Ta, Sn, Ni, and Cr.

5. The electrochemical element of claim 1, wherein the first coating has an average thickness $T1_A$ of 0.1 nm or more and 50 nm or less.

6. The electrochemical element of claim 1, wherein
   Cb>Ct is satisfied, where
   Cb is a concentration by atomic ratio of the first element at a position of 0.25T1 from the surface of the lithium silicate composite particle in the first coating, and
   Ct is a concentration by atomic ratio of the first element at a position of 0.75T1 from the surface of the lithium silicate composite particle in the first coating.

7. The electrochemical element of claim 6, wherein the concentration Cb and the concentration Ct satisfy Cb/Ct>2.

8. The electrochemical element of claim 1, wherein the first coating further includes carbon atoms.

9. The electrochemical element of claim 8, wherein Rb>Rt is satisfied, where
   Rb is an atomic ratio of the first element relative to the carbon atom in the first coating at a position of 0.25T1 from the surface of the lithium silicate composite particle, and
   Rt is an atomic ratio of the first element relative to the carbon atom in the first coating at a position of 0.75T1 from the surface of the lithium silicate composite particle.

10. The electrochemical element of claim 9, wherein the atomic ratio Rb and the atomic ratio Rt satisfy Rb/Rt>1.3.

11. The electrochemical element of claim 9, wherein the atomic ratio Rb is 5 or more and 99 or less.

12. The electrochemical element of claim 9, wherein the atomic ratio Rt is 0.01 or more and 10 or less.

13. The electrochemical element of claim 1, wherein at least a portion of the first coating is further covered with an electrically conductive second coating including carbon atoms.

14. The electrochemical element of claim 13, wherein an average thickness $T1_A$ and an average thickness $T2_A$ satisfy the relation of $0 < T2_A/T1_A < 1500$, where
   $T1_A$ is an average thickness of the first coating that covers at least a portion of the surface of the lithium silicate composite particle, and
   $T2_A$ is an average thickness of the electrical conductive second coating.

15. An electrochemical device including a first electrode, a second electrode, and a separator interposed therebetween, wherein
   one of the first electrode and the second electrode is composed of the electrochemical element of claim 1.

* * * * *